United States Patent [19]
Lehman

[11] Patent Number: 6,164,684
[45] Date of Patent: Dec. 26, 2000

[54] FASTENING STRUCTURE FOR INTERCONNECTING PARTS OF A VEHICLE OCCUPANT PROTECTION APPARATUS

[75] Inventor: Robert R. Lehman, Clawson, Mich.

[73] Assignee: TRW Vehicle Safety Systems Inc., Lyndhurst, Ohio

[21] Appl. No.: 09/144,136

[22] Filed: Aug. 31, 1998

[51] Int. Cl.[7] .................................................. B60R 21/22
[52] U.S. Cl. ..................... 280/728.2; 280/731; 403/408.1
[58] Field of Search ............................ 280/728.1, 728.2, 280/731, 743.1; 403/408.1; 411/337, 511

[56] References Cited

U.S. PATENT DOCUMENTS

| | | | |
|---|---|---|---|
| 3,305,995 | 2/1967 | Armstrong et al. | 403/408.1 X |
| 3,606,416 | 9/1971 | Hatter et al. | 403/408.1 |
| 4,746,239 | 5/1988 | Marquardt | 403/408.1 X |
| 5,306,039 | 4/1994 | Nakayama | 280/728.2 |
| 5,456,488 | 10/1995 | Bauer | 280/728.2 X |
| 5,590,900 | 1/1997 | Duran et al. | 280/731 |
| 5,597,177 | 1/1997 | Matsuura | 280/731 |
| 5,603,524 | 2/1997 | Barnes et al. | 280/728.2 |
| 5,615,910 | 4/1997 | Margetak et al. | 280/731 |
| 5,624,130 | 4/1997 | Ricks | 280/731 |
| 5,806,882 | 9/1998 | Stein et al. | 280/728.2 X |
| 5,848,801 | 12/1998 | Hirt | 280/731 |
| 5,888,012 | 3/1999 | Nygren, Jr. et al. | 403/408.1 X |
| 5,931,492 | 8/1999 | Mueller et al. | 280/728.2 |
| 5,947,630 | 9/1999 | Dillon | 280/728.2 X |

*Primary Examiner*—J. J. Swann
*Assistant Examiner*—F. Zeender
*Attorney, Agent, or Firm*—Tarolli, Sundheim, Covell, Tummino & Szabo L.L.P.

[57] ABSTRACT

An apparatus (10) includes a reaction structure (28) configured to support an inflator (12) for an inflatable vehicle occupant protection device (14). The apparatus further includes a cover (40) configured to conceal the protection device (14) in a vehicle. The reaction structure (28) has an aperture (86). The cover (40) includes a compressively deflectable mounting flap (42) having an aperture (94) aligned with the aperture (86) in the reaction structure (28). A fastener assembly (54) fastens the mounting flap (42) to the reaction structure (28). The fastener assembly (54) includes a screw-threaded stud (80) extending through the aligned apertures (86, 94) in the mounting flap (42) and the reaction structure (28). A nut (70) is received over the stud (80) in an installed position to retain the mounting flap (42) between the nut (70) and the reaction structure (28). The reaction structure (28) has a rigid stand-off portion (102) projecting at least partially through the aperture (94) in the mounting flap (42). The nut (70) is tightened against the reaction structure (28) at the stand-off portion (102) of the reaction structure (28).

5 Claims, 2 Drawing Sheets

FASTENING STRUCTURE FOR INTERCONNECTING PARTS OF A VEHICLE OCCUPANT PROTECTION APPARATUS

FIELD OF THE INVENTION

The present invention relates to an apparatus for protecting an occupant of a vehicle, and particularly relates to an apparatus including an inflatable vehicle occupant protection device.

BACKGROUND OF THE INVENTION

An inflatable vehicle occupant protection device, such as an air bag, is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment to help restrain movement of an occupant of the vehicle.

An air bag and an inflator are typically assembled together as parts of an air bag module which is separate from the crash sensor. The air bag module is located in the vehicle adjacent to the vehicle occupant compartment. For example, a driver's side air bag module may be located on the vehicle steering column. A passenger side air bag module may be located in the vehicle instrument panel.

In addition to the air bag and the inflator, an air bag module typically includes a reaction structure, a retainer, and a cover. The reaction structure supports the inflator. The reaction structure may thus comprise, for example, a reaction canister which contains the inflator, or a reaction plate upon which the inflator is mounted. The reaction structure may alternatively comprise a structural portion of a vehicle part, such as a seat, door, or instrument panel, upon which the inflator is mounted. The retainer typically comprises a circular ring or a rectangular frame surrounding the inflator. An edge portion of the air bag also surrounds the inflator. A plurality of fasteners clamp the edge portion of the air bag between the retainer and the reaction structure.

The cover includes a deployment door which extends over the air bag to conceal the air bag and the other parts of the module from view in the vehicle occupant compartment. The cover may further include mounting flaps. The mounting flaps on the cover may be fastened to the reaction structure by the same fasteners that clamp the edge portion of the air bag against the reaction structure.

When the inflation fluid emitted from the inflator begins to inflate the air bag, it moves the air bag outward against the deployment door on the cover. The cover ruptures under the force of the inflation fluid pressure acting on the air bag. The deployment door is then moved pivotally out of the path of the air bag as the inflation fluid continues to inflate the air bag outward from the cover and into the vehicle occupant compartment. In addition to rupturing the cover, the force of the inflation fluid pressure tends to pull the clamped edge portion of the air bag outward from between the retainer and the reaction structure. Therefore, the fasteners are engaged tightly enough to provide a clamping force that resists the inflation fluid pressure force. The mounting flaps on the cover may be compressively deflected by the clamping force applied to the edge portion of the air bag.

SUMMARY OF THE INVENTION

In accordance with the present invention, an apparatus includes a reaction structure configured to support an inflator for an inflatable vehicle occupant protection device. The apparatus further includes a cover configured to conceal the protection device in a vehicle. The reaction structure has an aperture. The cover includes a compressively deflectable mounting flap having an aperture aligned with the aperture in the reaction structure.

A fastener assembly fastens the mounting flap to the reaction structure. The fastener assembly comprises a screw-threaded stud extending through the aligned apertures in the mounting flap and the reaction structure. A nut is received over the stud to retain the mounting flap between the nut and the reaction structure. The reaction structure has a rigid stand-off portion projecting at least partially through the aperture in the mounting flap. The nut is tightened against the reaction structure at the stand-off portion of the reaction structure.

BRIEF DESCRIPTION OF THE DRAWINGS

The foregoing and other features of the present invention will become apparent to those skilled in the art to which the present invention relates from reading the following description with reference to the accompanying drawings, in which.

DESCRIPTION OF PREFERRED EMBODIMENTS

Figure 1:
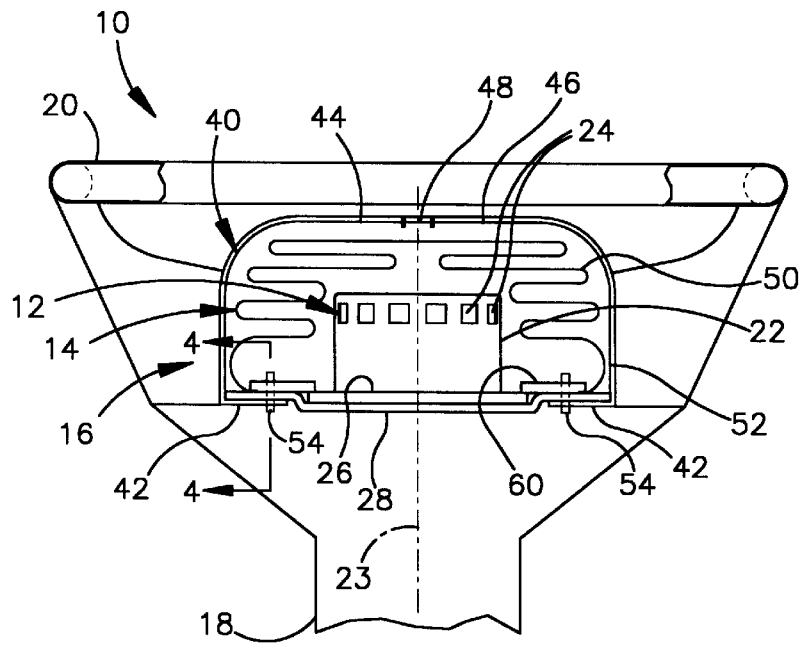
FIG. 1 is a schematic view of a vehicle occupant protection apparatus comprising a first embodiment of the invention.
Figure 2:
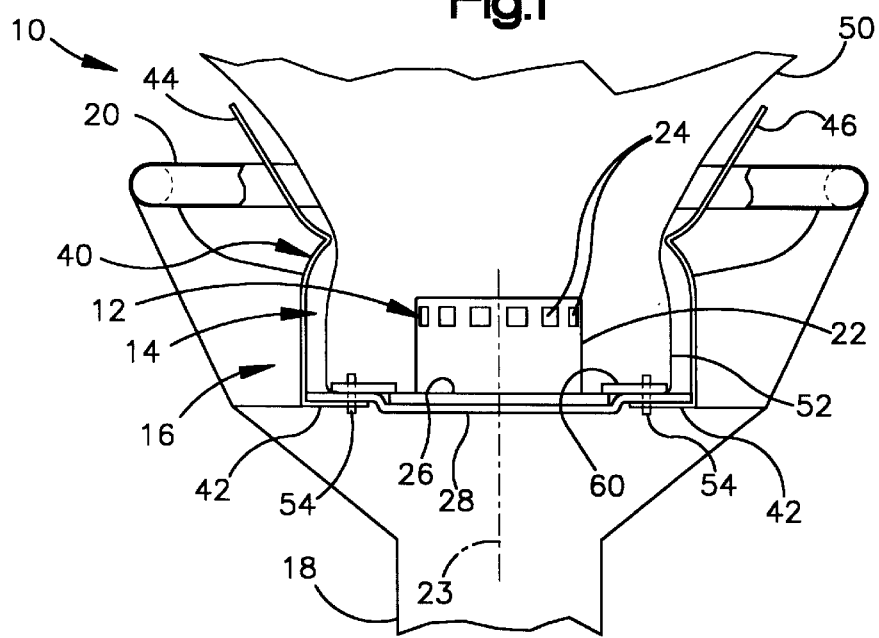
FIG. 2 is a view showing the apparatus of FIG. 1 in an actuated condition.

A vehicle occupant protection apparatus 10 comprising a preferred embodiment of the present invention is shown schematically in FIGS. 1 and 2. The apparatus 10 includes an inflator 12 and a particular type of inflatable vehicle occupant protection device 14 which is commonly referred to as an air bag. In the preferred embodiment of the invention, the air bag 14 and the inflator 12 are parts of an air bag module 16 which is mounted on a vehicle steering column 18 near the center of the steering wheel 20. The air bag 14 is inflatable from a folded, stored condition, as shown in FIG. 1, to an unfolded, deployed condition, as shown partially in FIG. 2. When the air bag 14 is being inflated, it moves toward the driver of the vehicle. The air bag 14 then helps to restrain the driver from moving toward the steering wheel 20 under the influence of vehicle crash forces.

The air bag 14 is constructed of panels of a known air bag material. Such materials include woven materials and plastic films. The panels of air bag material are interconnected along seams formed by stitches, ultrasonic welds, adhesives, heat staking, or the like, depending on the particular air bag material of which the panels are formed. Preferably, the air bag 14 is constructed of panels formed of a nylon fabric which is coated with silicone. Any suitable arrangement of folds can be used to place the air bag 14 in the stored condition of FIG. 1. Moreover, other inflatable vehicle occupant protection devices that can be used in accordance with the invention include, for example, inflatable seat belts, inflatable knee bolsters, inflatable headliners or side curtains, and knee bolsters operated by inflatable air bags.

The inflator 12 contains a source of inflation fluid for inflating the air bag 14. As known in the art, the inflator 12 may contain an ignitable gas generating material which, when ignited, generates a large volume of inflation gas. The inflator 12 may alternatively contain a stored quantity of pressurized inflation fluid, or a combination of pressurized inflation fluid and ignitable material for heating the inflation fluid.

As shown schematically in FIGS. 1 and 2, the inflator 12 in the preferred embodiment has a cylindrical housing 22 with a central axis 23. A circumferentially extending array of inflation fluid outlet openings 24 is located near the upper end of the housing 22. An annular flange 26 projects radially outward from the lower end of the housing 22. The flange 26 rests on a reaction plate 28. The reaction plate 28 may have any structure that is suitable for supporting the inflator 12 on the steering column 18. Accordingly, the reaction plate 28 may define the hub of the steering wheel 20, or may be mounted on another part (not shown) which defines the hub of the steering wheel 20, as known in the art.

Figure 3:
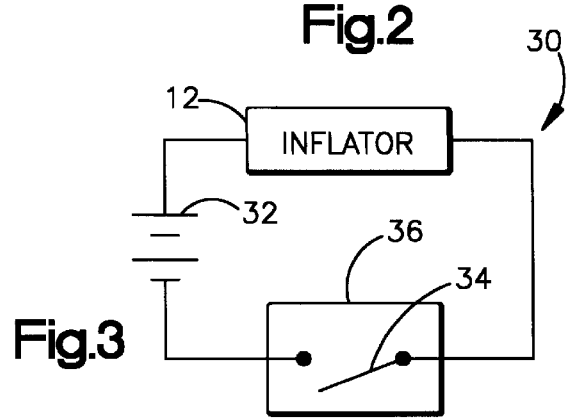
FIG. 3 is a schematic view of an electrical circuit including parts of the apparatus of FIG. 1.

The inflator 12 is included in an electrical circuit 30 (FIG. 3) with a power source 32 and a normally open switch 34. The power source 32 is preferably the vehicle battery and/or a capacitor. The switch 34 is part of a sensor 36 which senses a vehicle condition indicating the occurrence of a crash. Such a condition may comprise, for example, sudden vehicle deceleration caused by a crash. If the crash-indicating condition is at or above a predetermined threshold level, it indicates the occurrence of a crash having at least a predetermined threshold level of severity. The threshold level of crash severity is a level at which inflation of the air bag 14 is desired to help restrain movement of the driver of the vehicle, as described above. The switch 34 then closes, and electric current is directed through the inflator 12 to actuate the inflator 12. As a result, the inflator 12 rapidly emits a large volume of inflation fluid which flows into the air bag 14 to inflate the air bag 14.

A flexible plastic cover 40 encloses the air bag 14 and the inflator 12. The cover 40 includes a pair of mounting flaps 42 which extend beneath the reaction plate 28. The cover 40 further includes first and second deployment door panels 44 and 46 which extend over the air bag 14. The deployment door panels 44 and 46 are held in closed positions, as shown in FIG. 1, by a rupturable section 48 of the cover 40.

As the inflation fluid emitted from the inflator 12 begins to inflate the air bag 14, it moves the air bag 14 outward against the cover 40. The force of the inflation fluid pressure acting on the air bag 14 ruptures the rupturable section 48 of the cover 40 and moves the deployment door panels 44 and 46 pivotally outward, as shown in FIG. 2. As the inflation fluid continues to inflate the air bag 14, it moves the air bag 14 outward from the cover 40 past the deployment door panels 44 and 46.

The air bag 14 has a body 50 and a neck 52. When the air bag 14 is being inflated from the condition of FIG. 1 to the condition of FIG. 2, the body 50 of the air bag 14 is deployed from the inflator 12 toward the driver of the vehicle. The neck 52 of the air bag 14 is retained on the reaction plate 28 with the inflator 12. Specifically, a plurality of fastener assemblies 54 clamp the neck 52 between the reaction plate 28 and a retainer ring 60 which is located above the reaction plate 28. The fastener assemblies 54, two of which are shown in FIGS. 1 and 2, are spaced apart in an array extending circumferentially around the retainer ring 60. The fastener assemblies 54 also clamp the inflator flange 26 between the reaction plate 28 and the retainer ring 60.

Several of the fastener assemblies 54 extend through the mounting flaps 42 beneath the reaction plate 28 to fasten the mounting flaps 42 to the reaction plate 26. As shown by way example in FIG. 4, each of those fastener assemblies 54 includes a nut 70 and a screw-threaded bolt 72. The head portion 74 of the bolt 72 overlies an upper side surface 76 of the retainer ring 60 and is fixed to the retainer ring 60 by a weld 78. The stud portion 80 of the bolt 72 projects from the head 74 through an aperture 82 in the retainer ring 60.

The retainer ring 60 is received within the neck 52 of the air bag 14, with each stud 80 projecting outward through a corresponding aperture 84 in the neck 52. The neck 52 and the retainer ring 60 are then placed together on the reaction plate 28 so that the neck 52 is received between a lower side surface 88 of the retainer ring 60 and an upper side surface 90 of the reaction plate 28. Each stud 80 further projects through a corresponding aperture 86 in the reaction plate 28.

Figure 4:
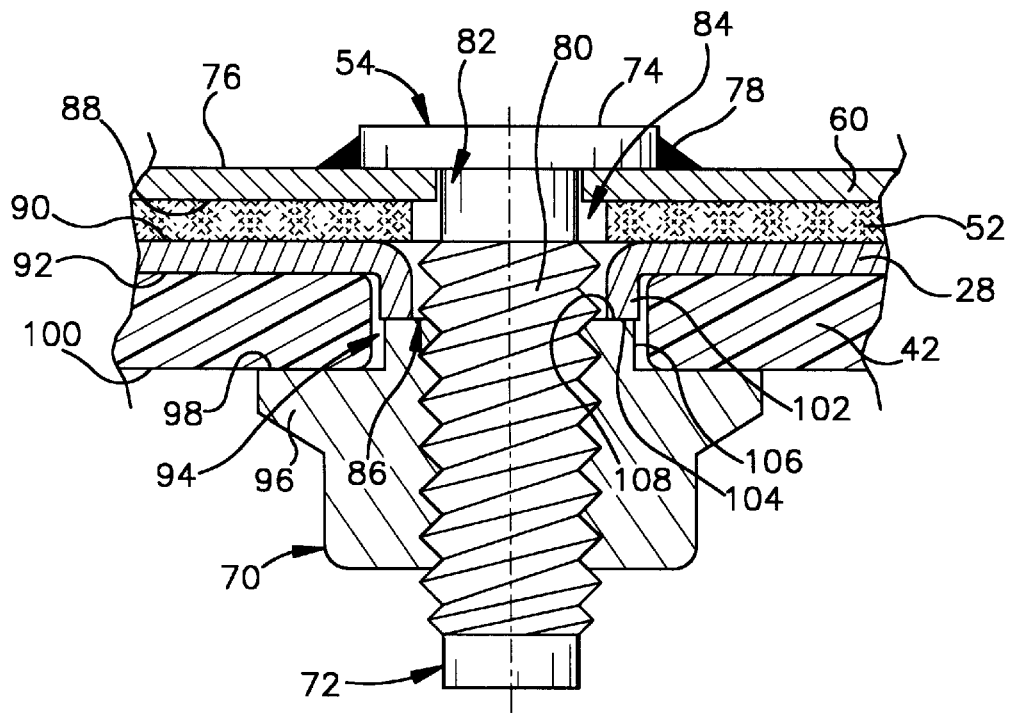
FIG. 4 is an enlarged partial view of parts of the apparatus of FIG. 1.

As further shown by way of example in FIG. 4, each mounting flap 42 is received against a lower side surface 92 of the reaction plate 28. The studs 80 then project further through aligned apertures 94 in the mounting flaps 42. Each nut 70 has a radially projecting flange 96 with a planar upper side surface 98. The nuts 70 are screwed onto the studs 80 to installed positions in which the upper side surfaces 98 on the nuts 70 abut lower side surfaces 100 of the mounting flaps 42.

The apertures 86 in the reaction plate 28 are defined by short, extruded cylindrical portions 102 of the reaction plate 28, one of which is shown in FIG. 4. More specifically, each aperture 86 is bounded by an annular edge surface 104 of the corresponding cylindrical portion 102 of the reaction plate 28. The annular edge surface 104 is spaced axially downward, as viewed in FIG. 4, from the lower side surface 92 of the reaction plate 28. The extruded cylindrical portions 102 of the reaction plate 28 thus project downward into the corresponding apertures 94 in the mounting flaps 42.

When the nuts 70 are screwed onto the studs 80, cylindrical inner end portions 106 of the nuts 70 are received in the apertures 94 in the mounting flaps 42. An annular upper end surface 108 of each nut 70 is then moved into abutment with the annular lower end surface 104 of the corresponding cylindrical portion 102 of the reaction plate 28. The metal to metal contact at the abutting annular surfaces 108 and 104 enables the nut 70 to be screwed tightly and securely against the reaction plate 28. Additionally, the cylindrical portion 102 of the reaction plate 28 functions as a stand-off structure which spaces the upper side surface 98 of the nut 70 from the lower side surface 92 of the reaction plate 28 when the nut 70 is in the installed position. Such spacing provides clearance for the full thickness of the mounting flaps 42 between the nuts 70 and the reaction plate 28. Accordingly, each mounting flap 42 in the first embodiment of the present invention is substantially free of compressive deflection between the nuts 70 and the reaction plate 28.

Figure 5:
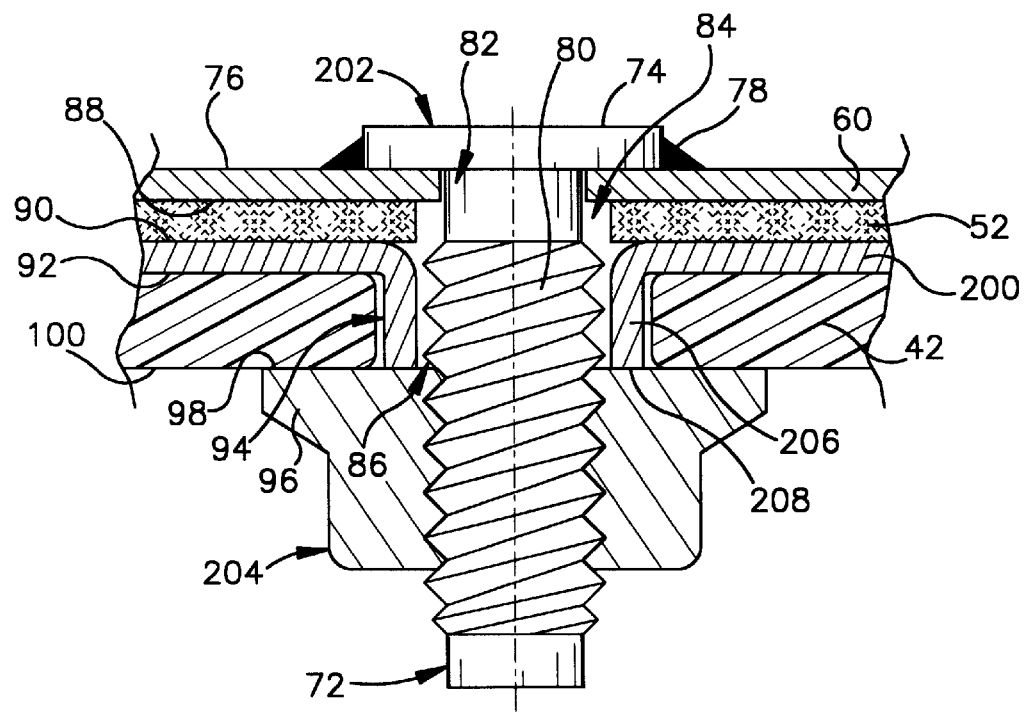
FIG. 5 is a view similar to FIG. 4 showing parts of a second embodiment of the invention.

A second embodiment of the present invention is shown partially in FIG. 5. The second embodiment includes many parts that are substantially the same as corresponding parts of the first embodiment described above. This indicated by the use of the same references numbers for such corresponding parts in FIGS. 5 and 4. However, the second embodiment includes a reaction plate 200 that differs somewhat from the reaction plate 28 in the first embodiment. The second embodiment further includes a plurality of fastener assemblies 202, one of which is shown in FIG. 5, that differ somewhat from the fastener assemblies 54.

The nuts 204 in the fastener assemblies 202 do not have axially projecting inner end portions like the inner end portions 106 of the nuts 70 (FIG. 4). This is because the extruded cylindrical portions 206 of the reaction plate 202 are long enough to project fully through the apertures 94 in the mounting flaps 42. The annular upper side surfaces 98 of the nuts 204 move tightly into abutment with annular lower end surfaces 208 of the cylindrical portions 206 upon movement of the nuts 204 to their installed positions.

From the foregoing description of the invention, those skilled in the art will perceive improvements, changes and modifications. Such improvements, changes and modifications within the skill of the art are intended to be covered by the appended claims.

Having described the invention, the following is claimed:

1. Apparatus comprising:

an inflatable vehicle occupant protection device;

an inflator for providing inflation fluid to inflate said inflatable vehicle occupant protection device;

a single-piece, metal reaction plate supporting said inflator and said inflatable vehicle occupant protection device, said reaction plate having a first aperture;

a cover configured to conceal the protection device in a vehicle, said cover including a compressively deflectable mounting flap having a second aperture aligned with said first aperture; and a fastener assembly fastening said mounting flap to said reaction plate, said fastener assembly comprising a screw-threaded stud having a longitudinal axis and extending through said apertures and a nut received over said stud to retain said mounting flap between said nut and said reaction plate;

part of said reaction plate defining a rigid, extruded stand-off portion projecting at least partially through said second aperture, said first aperture of said reaction plate being defined by said stand-off portion;

said nut being tightened against said reaction plate at said stand-off portion of said reaction plate, said nut abutting both said mounting flap and said stand-off portion, said mounting flap being substantially free of compressive deflection between said nut and said reaction plate.

2. Apparatus as defined in claim 1 wherein said nut includes a first surface portion and a second surface portion spaced axially from said first surface portion, said first surface portion engaging said stand-off portion and said second surface portion engaging said mounting flap.

3. Apparatus as defined in claim 1 wherein said stand-off portion of said reaction structure is an extruded portion of said reaction structure and has an edge surface defining a peripheral boundary of said first aperture.

4. Apparatus as defined in claim 1 wherein said nut has an inner end portion projecting axially into abutment with said stand-off portion of said reaction structure within said second aperture.

5. Apparatus as defined in claim 1 wherein said stand-off portion of said reaction structure projects fully through said second aperture.

* * * * *